Oct. 31, 1950 H. R. MILNES 2,527,888
ALKALINE STORAGE BATTERY
Filed May 31, 1946

PERVIOUS INSULATING SHEETS

INVENTOR:
HENRY REGINALD MILNES
By Richardson and David
ATTYS

Patented Oct. 31, 1950

2,527,888

UNITED STATES PATENT OFFICE 2,527,888

ALKALINE STORAGE BATTERY

Henry Reginald Milnes, Bingley, England

Application May 31, 1946, Serial No. 673,280
In Great Britain June 18, 1945

2 Claims. (Cl. 136—45)

This invention relates to improvements in Edison and Jungner types of electric storage cells which are more commonly known as nickel-iron or nickel-cadmium alkaline cells or accumulators respectively.

The principal object of the present invention is to provide a novel construction of alkaline storage cell which has some or all of the following characteristics: that it has a high charging rate, has a level discharging rate, is capable of rapid discharge without damage, has a minimum of internal resistance, is of less weight for a given capacity, has a greater capacity size-for-size, and is more robust and durable so giving a long useful life.

Another object of the invention is to provide a novel construction of electrode for such a cell which is thin, permits internal escape of gas in the event of gasification and avoids shedding of the active material.

The above and further objects of this invention will be apparent from the following description.

Hitherto in alkaline storage cells the electrodes have comprised envelopes of metal grids or perforated strips which contain the active material and these electrodes have been arranged in spaced relation alternately negative and positive within a casing containing a free flowing electrolyte, but in contra-distinction to such construction the alkaline electric storage cell according to the present invention has its electrodes in the form of two perforated metal plates, each indented, provided with depressions, grooves or the like, and arranged back-to-back with active material on their outer surfaces such that air spaces or passages are formed between the metal plates through which gas generated at the electrode surfaces may escape after passing through the perforations in the metal plates and unlike electrodes are separated by pervious insulating sheets. The metal of the negative electrode is conveniently iron or steel whilst that of the positive electrode is nickel or nickel-plated steel.

The invention is not limited to the use of any particular active materials although it is preferred to use nickel hydrate ($Ni(OH)_2$) with or without a proportion of graphite as the positive active material and finely divided pure iron with or without finely divided cadmium (or the oxides thereof) as the negative active material, whilst the electrolyte may be any known solution such as caustic potash or caustic soda such as are commonly used for the purpose.

In order that the invention may be clearly understood and readily carried into effect a preferred construction of cell is, by way of example, hereinafter more fully described with reference to the accompanying drawings, which are given for purposes of illustration only and not of limitation.

In these drawings—

Figure 1:
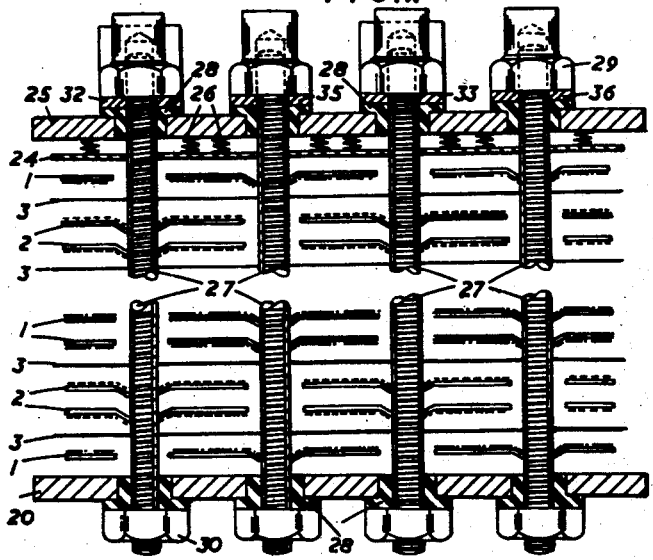
Figure 1 is a side view of the cell with the electrodes shown spaced apart.
Figure 2:
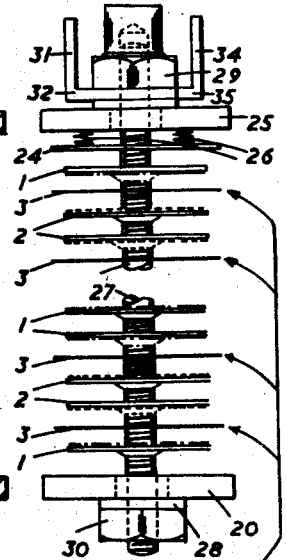
Figure 2 is an end elevation corresponding to Figure 1.

Referring now to the said drawings and particularly to Figures 1 and 2 thereof, the cell, in accordance with normal practice, consists of a pair of, or plurality of alternately arranged, positive and negative electrodes of which like electrodes are electrically connected and the assembly is contained in a casing containing an electrolyte.

In contra-distinction to previous alkaline storage cells, the active material is coated on to the surface of a thin metal sheet and unlike electrodes are separated by pervious insulating sheets. In Figures 1 and 2 of the drawing the reference numeral 1 is applied to each of the positive electrodes, the number 2 is applied to each of the negative electrodes and the numeral 3 to each of the sheets of pervious insulating material.

Figure 5:
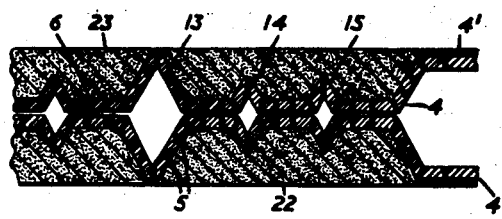
Figure 5 is a perspective view of an electrode plate.
Figure 4:
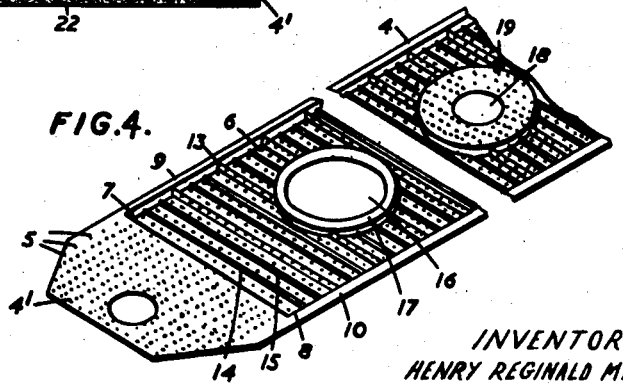
Figure 4 is a longitudinal section through an electrode.

A preferred form of electrode plate is illustrated in Figure 5 (of which a section on a larger scale is illustrated in Fig. 4) and comprises a thin metal plate 4 (say 1/32 inch or less) which is perforated over its entire surface with a large number of small holes 5. Parallel depressions 6 are formed throughout the length of each plate to extend almost completely across the plate so providing end walls 7, 8 to the grooves 6 which are stiffened by the margins 9, 10. Every third (or fourth) rib between the depressions 10 rises to a level with the margins 9, 10 to strengthen the edge and assist the level pasting of the electrode plate. The effect of the numerous perforations 5 is that some will occur in the ribs between the depressions 6 and particularly at the junctions of the ribs and bases of the depressions, but instead of the all-over perforation the plate, with its depressions, may be perforated only at the desired places, i. e. in the ribs and especially at the junctions thereof with the bases of the grooves.

Subsequent to the formation of the depressions 6 in the plate 4 (Figure 5), large holes 16 are provided in the plates which are bounded by a flattening of the ribs to form portions 17 which lie in the plane of the margins 9, 10 and form stiffened end walls to the depressions 6. The plates are also provided with small holes 18 which are also surrounded by flattened portions 19 lying in the plane of the margins. In each plate there is, in the example illustrated, four holes at equal centres apart with a small hole 18 alternating with a large hole 16. The plate 4 (Figure 5) is provided at one end with an extension piece 4¹. When two plates are arranged back-to-back, bases of the depressions engage and channels are formed therebetween for the escape of gas. The invention is not, however, limited to the form of depressions illustrated as other shapes or arrangements of ribs, grooves or depressions may be employed to provide spaces between the plates when arranged back-to-back.

The metal of the plates 4 for the positive electrodes is nickel or nickel-plated iron or steel whilst the metal of the plates for the negative electroes is iron or steel. The depressed surfaces of the electrode plates are pasted each with a thin coating of active material which fills the depressions. This pasting of active material is carefully carried out to leave as smooth and even a layer of active material on the electrode plate as is practically possible. The nickel or nickel plated positive electrodes are pasted with nickel hydrate $(Ni(OH)_2)$ with or without a proportion of graphite, whilst the iron or steel plates of the negative electrodes are pasted with iron oxide or an admixture of cadmium oxide and iron oxide. Finely divided pure iron or finely divided pure iron containing an amount of finely divided cadmium may be used as the active material for the negative electrode, but it is to be understood that the invention is not limited to the use of any particular active materials nor to particular metals for the electrode sheets as any known active materials may be used on any suitable metal sheets.

The pervious insulating sheets 3 are conveniently a woven or knitted fabric or felt of Nylon (Polyamide) threads, mercerised cotton threads, glass filaments or other material in filamentary form which is a non-conductor of electricity and is not adversely affected by the electrolyte. Instead of weaving such material they may be knitted or otherwise meshed, the object being to provide pervious sheets with interstices or holes therein. The invention is not, however, limited to a knitted or woven material since the porosity desired may be imparted into sheets of suitable materials by minute perforations, and, indeed, porous rubber sheets may be used for the purpose. The pervious sheets 3 are made oversize to the size of the electrode plates and have holes formed therein concentric with the holes in the plates, and the holes in the pervious sheets are desirably not larger but slightly smaller than the small holes 18 in the electrode plates.

The interstices of the pervious sheets 3 when woven or knitted are filled to reduce porosity, primarily to prevent the active materials creeping therethrough, by means of an electrically non-conductive salt which is insoluble, or substantially insoluble, in water and is unchanged by the electrolyte even under electrolysis yet is porous enough to permit free ion flow through the electrolyte. As examples of such salts may be mentioned barium sulphate, calcium phosphate, magnesium oxide and aluminium silicate, of which the first mentioned is that which is at present preferred. It is furthermore preferred to work the salt into an adhesive, such as gum, and in this condition to apply the same to the pervious sheets so that the salt is worked into in the interstices or pores thereof and effectively retained during assembly of the cell.

It is further preferred to make the edges of these pervious sheets 3 impervious and also to make the edges around the holes therein similarly impervious by means which are electrically non-conductive, such as bituminous pitch, a rubber solution, paraffin wax or other substance having the desired characteristics. The imperverising of the edges of the sheets and the boundaries of the holes therein also prevent fraying of a knitted or woven fabric and it is carried whether or not the porosity of the woven or knitted fabric is reduced by means of a non-conductive salt, as described above, and where such salt is applied to the fabric with the aid of gum, as described above, it is also preferable to apply the same after the imperverising treatment.

The cell is constructed of prepared electrodes and prepared pervious insulating sheets conveniently in the following manner. Smooth rods are held in vertical spaced relation in a suitable jig and a stout metal, for example steel, plate 20 is threaded thereon. A first single (or half) positive electrode plate with the active material uppermost is now threaded on, next an insulating sheet 3 and then a negative electrode plate 2 the opposite way round to the positive electrode and with the active material face downwards followed by a further negative electrode plate in like disposition with the active material uppermost. The two metal plates of this negative electrode are thus back-to-back and bear against one another with the result that cavities are formed between the depressions. This is clearly illustrated in Figure 4 which shows two metal plates 4 and the space formed between their depressions 6 and also the perforations 5 whilst the layers of active material are indicated by the reference numerals 22, 23. In this figure, the numerals 13, 14 and 15 represent the ribs which define the channels in the plates 4, the rib 13 extending up to the level of the walls 7, 8.

Figure 3:
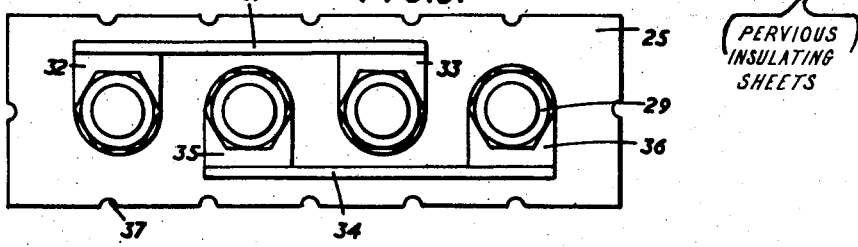
Figure 3 is a plan view looking down on Figure 1.

Another pervious insulating sheet 3 is positioned and then two positive electrodes 1 in like disposition to the single positive electrode originally positioned with their active materials on opposite sides as in the case of the negative electrode just described to form the gas escape channels. Further pairs of positive and negative plates with their separating insulating sheets are threaded on to the rods until a desired number of plates have been positioned when the pack is completed by a single positive electrode 1 with its active material face downwards. A thin flexible metal sheet 24 is laid over the final electrode and above this sheet is a further stout metal plate 25 between which plate and the sheet 24 are a large number of coil compression springs 26 which are evenly distributed over the surfaces of these two plates. The plates 20, 25 may serve to locate the cell in its casing and the plate 25 is, as shown in Figure 3, desirably provided with nicks or recesses 37 around its edges to permit gas to pass this plate. The springs may be loosely positioned or the plate 25 may be provided with short pins about which the coil compression springs 26 may be positioned. Rubber or other resilient medium may be used in place of springs.

The disposition of the electrodes is such that the small holes in the positive plates are in alignment and alternate with the large holes in the negative plates and vice versa and at this time the extensions 4¹ of the metal plates of the positive and negative electrodes project beyond the respective opposite ends of the assembly. The assembly, whilst still firmly held in the jig, is subjected to spring pressure on one of the stout metal end plates, say, the plate 25. The projecting extensions of like electrodes are connected together in any convenient manner say, in twos or threes and to a source of current for preliminary charging at a low rate over a fairly long period so that the plates are heavily charged to ensure bedding in of the active material and a reduction of the internal resistance. During this charging of the plates some contraction of the active material occurs and under the action of the spring pressure the end plates 20, 25 are brought nearer together. On completion of the charging and shrinking of the active material and whilst the assembly is still firmly held in the jig, the smooth rods used during assembly are removed and replaced by rods 27, which are threaded throughout their length. These rods 27 which may be slightly tapered at one end are of a diameter slightly larger than the diameter of the small holes 18 in the plates and when positioned they engage the edges of the smaller holes 18 but do not contact with the edges of the larger holes 16 as is indicated in Figure 1 of the drawings by an inclination of the electrode plates where they contact the threaded rods. Insulating bushes 28 are provided to isolate the threaded rods 27 from the end plates 20, 25 and nuts 29, 30 are engaged with the opposite ends of each of the threaded rods 27 to compress the assembly aided by the springs 26. The electric circuit between the threaded rods of electrodes of like polarity is completed by the provision of a busbar 31 having apertured lugs 32, 33 which are engaged under the nuts 29 of the first and third threaded rods, reading in from the lefthand side of Figure 1, and by a further busbar 34 similarly having apertured lugs 35, 36 similarly introduced under the nuts 29 of the second and fourth threaded rods. If any further contraction occurs or there is any irregularity in the contraction the multiplicity of springs 26 ensures even distribution of the pressure. The extensions of the electrode plates are now cut off and the assembly is ready to be introduced into a suitable casing, which will contain an electrolyte, into which casing it fits snugly and is spaced by the plates 20, 25. The casing will be closed off in the usual manner and provided with terminals which will be suitably connected to the busbars 31, 34 so that the complete battery is now ready for use.

The electrode plates are, as stated, thin and are flexible and something like 50 sets of plates may go to make up a cell some four inches deep with the negative active material substantially equal to the thickness of the positive active material, but the positive material may be in thicker layers than the negative material up to the order of three times as thick when the depth of the cell will be increased to about 5¼ inches. The area of the electrode plates and their number may be varied having regard to the capacity required and the desired final shape of the cell.

Thicker layers of active material gives some increase in capacity but also gives rise to a somewhat higher internal resistance. The number and depth of the depressions 6 in each electrode plate 4 in varying the effective thickness of active material also varies the capacity and internal resistance and in some cases it may be convenient to use plates some with one rib disposition and others with a different or deeper rib disposition to obtain a battery having a desired characteristic.

In the foregoing description reference is made throughout to single sheets of pervious insulating material between unlike electrodes, but if desired there may be a plurality of such sheets and indeed, it is preferred to use two sheets each of which is adhered to the active material on a metal electrode plate (for example by the gum retaining the salt in the pervious sheets) prior to the assembly of the cell. Of the various suitable materials for the porous sheets it is preferred to use nylon woven into a fine mesh fabric.

From the foregoing description, it will readily be appreciated that various changes in the design and construction of the cell may be resorted to without departing from the invention, of externally coating the active material onto metal plates adapted to permit escape of gas and isolating the unlike electrodes by pervious insulators in a compressed cell assembly, for example there may be only two threaded rods 27 and only a pair of holes in the plates or there may be six or even more such threaded rods with appropriate large and small holes in the electrode plates.

I claim:

1. In an alkaline electric storage cell, a plurality of positive and negative electrodes each formed of two finely perforated metal plates each embossed to provide a series of alternate, parallel, depressed portions and narrow, hollow, V-shaped ribs, the depressed portions being completely filled with active material up to and over the top of said ribs and being smooth to form a continuously extending external layer of active material, said plates being placed back-to-back so that the continuous layers of active material are outermost and so that the hollow portions of said V-shaped ribs are in register to form gas escape channels, pervious insulating sheets for separating the unlike electrodes, and resilient means for exerting end pressure on the assembled electrodes.

2. In an alkaline electric storage cell, a plurality of positive and negative electrodes each formed of two finely perforated metal plates each embossed to provide a series of alternate, depressed portions and narrow, hollow, ribs, the depressed portions being completely filled with active material up to and over the top of said ribs and being smooth to form a continuously extending external layer of active material, said plates being placed back-to-back so that the continuous layers of active material are outermost and so that the hollow portions of said ribs are in register to form gas escape channels, pervious insulating sheets for separating the unlike electrodes, and resilient means for exerting end pressure on the assembled electrodes.

HENRY REGINALD MILNES.

REFERENCES CITED

The following references are of record in the file of this patent:

UNITED STATES PATENTS

| Number | Name | Date |
| --- | --- | --- |
| 362,640 | Ludlow | May 10, 1887 |
| 422,301 | Hartmann | Feb. 25, 1890 |
| 524,843 | Silvey | Aug. 21, 1894 |
| 563,428 | Still | July 7, 1896 |
| 622,124 | Crowdus | Mar. 28, 1899 |
| 628,492 | Ridsdale | July 11, 1899 |
| 938,451 | Aylesworth | Oct. 26, 1909 |
| 1,262,228 | Morrison | Apr. 9, 1918 |
| 1,802,435 | Lubeck | Apr. 28, 1931 |
| 1,880,249 | Hagsphil | Oct. 4, 1932 |
| 2,191,313 | Carlisle | Feb. 20, 1940 |

FOREIGN PATENTS

| Number | Country | Date |
| --- | --- | --- |
| 389,029 | France | June 16, 1908 |
| 483,829 | Germany | Oct. 9, 1929 |
| 513,806 | Germany | Dec. 3, 1930 |